United States Patent
Sundell et al.

(10) Patent No.: US 8,144,661 B2
(45) Date of Patent: Mar. 27, 2012

(54) NODE AND A METHOD RELATING TO HANDOVER WITHIN MOBILE COMMUNICATION

(75) Inventors: Hans-Olof Sundell, Kalvsund (SE); Jan Backman, Kärna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 885 days.

(21) Appl. No.: 12/160,321

(22) PCT Filed: Jan. 9, 2006

(86) PCT No.: PCT/EP2006/000093
§ 371 (c)(1),
(2), (4) Date: Jul. 9, 2008

(87) PCT Pub. No.: WO2007/079771
PCT Pub. Date: Jul. 19, 2007

(65) Prior Publication Data
US 2010/0284365 A1   Nov. 11, 2010

(51) Int. Cl.
*H04W 4/00* (2009.01)
(52) U.S. Cl. .................... 370/331; 455/436
(58) Field of Classification Search .......... None
See application file for complete search history.

(56) References Cited

U.S. PATENT DOCUMENTS

| | | | |
|---|---|---|---|
| 6,725,044 B2 * | 4/2004 | Verma et al. | 455/444 |
| 7,289,504 B1 * | 10/2007 | Hippelainen et al. | 370/392 |
| 7,529,271 B2 * | 5/2009 | Forssell | 370/469 |
| 2003/0139183 A1 * | 7/2003 | Rantalainen | 455/435 |
| 2003/0153309 A1 * | 8/2003 | Bjelland et al. | 455/432 |
| 2003/0157927 A1 * | 8/2003 | Yi et al. | 455/411 |
| 2003/0169725 A1 * | 9/2003 | Ahmavaara et al. | 370/352 |
| 2003/0176187 A1 * | 9/2003 | Menzel et al. | 455/432.1 |
| 2004/0017798 A1 * | 1/2004 | Hurtta et al. | 370/352 |
| 2004/0033801 A1 * | 2/2004 | Yi et al. | 455/428 |

(Continued)

FOREIGN PATENT DOCUMENTS
DE   19928999 A1   12/2000
(Continued)

OTHER PUBLICATIONS
Siemens, AG, "Packet Forwarding for PS Handover" 3GPP TSG GERAN #17, Nov. 17, 2003, XP0023182272, pp. 1-4.

*Primary Examiner* — Bunjob Jaroenchonwanit
(74) *Attorney, Agent, or Firm* — Roger S. Burleigh

(57) ABSTRACT

The present invention relates to a packet data support node (10A) in a core network and connectable to at least one radio access network over a radio network control node. The packet data support node (10A) comprises duplicating means (12A) for duplicating original downlink data packets intended for a mobile station for which a hand-over is performed from the packet data support node acting as source node to a packet data support node acting as target node, control means (HA) for activating sending of the duplicated data packets to the packet data support node acting as a target node for forwarding to the mobile station such that the original downlink data packets are sent to the mobile station over a source radio access node from the source packet data node (10A). The duplicated data packets are sent to the mobile station over a target radio access node from the packet data source node acting as target node.

9 Claims, 5 Drawing Sheets

U.S. PATENT DOCUMENTS

| | | | |
|---|---|---|---|
| 2004/0067754 A1* | 4/2004 | Gao et al. | 455/442 |
| 2004/0127243 A1* | 7/2004 | Sarkkinen | 455/511 |
| 2004/0165554 A1* | 8/2004 | Chao et al. | 370/329 |
| 2005/0185619 A1* | 8/2005 | Niemela et al. | 370/331 |
| 2007/0081513 A1* | 4/2007 | Torsner | 370/349 |
| 2008/0025239 A1* | 1/2008 | Bossoli et al. | 370/312 |
| 2008/0268846 A1* | 10/2008 | Shaheen | 455/436 |
| 2008/0287131 A1* | 11/2008 | Ju et al. | 455/439 |
| 2009/0046655 A1* | 2/2009 | Zhao et al. | 370/331 |
| 2009/0129342 A1* | 5/2009 | Hwang et al. | 370/331 |
| 2009/0238138 A1* | 9/2009 | Huang et al. | 370/331 |
| 2009/0258651 A1* | 10/2009 | Sagfors et al. | 455/442 |
| 2010/0260099 A1* | 10/2010 | Frost et al. | 370/328 |
| 2010/0284365 A1* | 11/2010 | Sundell et al. | 370/331 |
| 2010/0323700 A1* | 12/2010 | Bachmann et al. | 455/436 |
| 2011/0051691 A1* | 3/2011 | Hietalahti et al. | 370/331 |

FOREIGN PATENT DOCUMENTS

| | | |
|---|---|---|
| WO | WO 01/89251 A | 11/2001 |
| WO | WO 2005/048634 A | 5/2005 |

* cited by examiner

NODE AND A METHOD RELATING TO HANDOVER WITHIN MOBILE COMMUNICATION

FIELD OF THE INVENTION

The present invention relates to the handling of handovers in a mobile communication system, for example when mobile stations move between radio access network cells, or within a core network, i.e. between nodes in a core network. Particularly it relates to a packet data support node in a core network which is connectable to at least one radio access network over a radio network control node. The invention also relates to a method of handling communication of packet data on the downlink to a mobile station over a core network comprising packet data support nodes and an access network comprising a radio network control node, the handover involving a change from a packet data support node acting as an old packet data node to a packet data node acting as a new packet data node, which may relate to different packet data support nodes or one and the same packet data support node for example in the case of dual access nodes.

STATE OF THE ART

In particularly cellular systems it is a general aim to be able to keep the communication path established as much as possible for example when mobile station moves between cells, between radio access networks and nodes in the core network. This among others means that interruptions for the end user shall be as few and as short as possible and preferably not noticeable at all for the end user.

Solutions that are implemented today as far as downlink traffic is concerned, i.e. traffic from a network to a mobile station, consists in duplicating or bicasting payload packets, particularly packet data units (PDUs) sent from the network to the mobile station to both the currently used cell or the old cell and the new cell which the mobile station is moving into.

This is for example the situation when a mobile station moves from radio coverage of one access network to another either of the same type as the first one or of a different type. If for example a mobile station moves from WCDMA (Wideband Code Division Multiplex Access) radio coverage, i.e. a WCDMA radio access network, (Iu mode over the Iu interface) to GSM or GPRS radio coverage (over the Gb interface, also called Gb mode) and at the same time changes packet data support node, for example SGSN (Serving GPRS Support Node), which also is called "Inter-SGSN IRAT PS handover Iu mode to Gb mode", the current 3GPP standard in TS 43.129, v6.5.0 states that a bicast of payload packets received from a GGSN (Gateway GPRS Support Node) towards the MS shall be performed by the radio network control node, RNC.

If a mobile station instead moves from GSN or GPRS radio coverage to WCDMA radio coverage, and at the same time changes for example SGSN node, which is called "Inter-SGSN IRAT PS handover Gb mode to Iu mode", the current 3GPP standard in TS 43.129, v6.5.0 states that bicasting of payload packets received from for example a GGSN towards a mobile station shall be performed by the SGSN directly towards the RNC.

It is however a problem with the above discussed solutions that the nodes in the core network, for example SGSN nodes, and the nodes in the radio network may belong to different operators, and, more generally, that the access network is involved in the procedure. This makes it hard to configure and maintain the communication path, and to appropriately handle network security aspects. In addition thereto it is difficult to control charging in a desired manner.

SUMMARY OF THE INVENTION

A solution to the above mentioned problems is therefore needed through which communication paths better can be maintained and through which the communication paths are easier to configure. A solution is also needed through which network security aspects can be duly considered as well as charging issues can be more easily and appropriately controlled and handled. Moreover a solution is needed which is cheap and easy to implement. Particularly an arrangement or a solution is needed which it can be implemented irrespectively of for example different nodes or access networks supporting the new technology or not.

Particularly a packet data support node of a core network is needed through which one or more of the above mentioned objects can be achieved. Furthermore a method is needed through which one or more of the above mentioned objects can be achieved.

Therefore a packet data support node core network as initially referred to is suggested which comprises duplicating means for duplicating original downlink data packets (payload) intended for a mobile station for which a handover is performed from the packet data source node acting as a source node to a packet data support node acting as a target packet data support node. It further comprises control means for activating sending of the duplicated data packets to the packet data support node acting as a target node for forwarding therefrom to the mobile station so that the original downlink data packets are sent to the mobile station over the source radio access node from the source packet data node and so that the duplicated data packets are sent to the mobile station over a target radio access node from the packet data support node acting as a target node. Particularly the packet data support node is adapted to handle access to one, first, radio access network over a radio network control node. Particularly it is adapted to handle access to a Wireless Local Area Network WLAN, or a WCDMA network over a radio network control node, RNC. Particularly, in another embodiment, it comprises a dual or multiple packet data support node supporting access over two or more access networks implementing different access technologies. In a particular embodiment it is adapted to support WCDMA access technology for example over an RNC and 2G/3G access technology over a BSS of a GERAN or UTRAN.

Particularly the packet data support node, whether a dual access node or a multiple access node or not, it is adapted to send original packet data to a first radio network control node acting as a source access node and to send duplicated packet data to a packet data support node acting as a new packet data support node to which handover is done.

In a particular embodiment the packet data support node comprises an SGSN, for example a 2G-SGSN or a 3G-SGSN, or a CGSN (Combined GPRS Support Node).

Particularly it is adapted to send the original packet data to a source BSS of the 2G access network or a source RNC of the 3G access network and it is adapted to initiate sending of the duplicated packets to the target RNC via a new 3G SGSN of the core network or to a target BSS for 2G access respectively.

In a particular embodiment, when for example performing, a handover from WCDMA to GSM/GPRS or similar, it comprises signal providing means for sending an information message to a source radio network control node and as a handover is performed, duplication is handled by said packet data support node when acting as an old packet data support node. The intention therewith is particularly to prevent the source radio network control node from performing a packet data duplication according to the standards in the state of the art section on the specification. Particularly the source radio network control node comprises an RNC and the old packet data support node comprises a 3G SGSN or CGSN, whereas the target radio network control node is a BSS node and the new packet data support node is 2G SGSN or a CGSN. The information message may consists of an information element at a location in the message, or more generally in an already existing used message, preferably the information element containing zero information or no duplication related information or an instruction not to perform a duplication. Particularly the information element is a radio access bearer to forwarding data which is set to null or NIL. This means that, advantageously, the radio network control node is not even made aware of a duplication being performed and it is hence not involved at all in any duplication operations at handovers etc. which exclusively are handled by the core network, which is most advantageous. Of course, in alternative implementations the information element may contain some information somehow indicating that no duplication is to be performed etc., and if it is desired it may comprise a specific message or some other information elements that may be used.

Most advantageously there is simply no information in the information element normally containing information about and/or to which a duplicated message should be sent etc. (if a duplication is due, e.g. because of a handover of a mobile station).

In an advantageous embodiment the packet data support node is adapted to control duplication related operations such that they are exclusively handled within the core network containing said packet data support node.

A method is therefore also provided which comprises the steps of, after completed handover preparation procedure involved in setting up communication channels to the mobile station over a new, target radio network control node;
duplicating received, original, data packets in the old or source packet data node;
sending the received original data packets to the previous, source radio network control node;
sending the duplicated data packets to the packet data support node acting as a new target packet data support node, and sending the duplicated data packets to the mobile station from the packet data support node acting as a new target packet data node.

Particularly the method comprises the step of terminating the duplication of packet data upon reception of a message from the new target radio network control node in the packet data support node acting as an old, source packet data support node.

Particularly the old, source, radio network control node comprises a WLAN access node or an RNC of a Wideband Code Division Multiplex Access network and the method further comprises the step of; sending an information message from the packet data node acting as an old packet data support node to the source radio network control node. In one implementation the information message sending step comprises using an information element of an existing message. The message with the information element in an existing message, particularly comprises an zero data message, indirectly indicating that no duplication of packet data is to be performed, or an information element containing no information about any duplication whatsoever.

Particularly all duplication and sending of duplicated packet data is exclusively handled by the packet data support nodes of the core network, and hence the access networks are not involved at all in this procedure other than receiving or not receiving duplicated packet data, particularly even without knowing that the data has been duplicated.

Particularly at least the target radio network control node comprises a BSS node and the handovers are handover within or to GSM/GPRS or similar network. In one implementation the packet data support node acting as an old packet data support node also acts as a new packet data support node and even more particularly it comprises a dual access node supporting access to access networks implementing different radio access technologies. Of course, in a general the old and new packet data support nodes are different and e.g. the old and/or the new packet data support node may comprise a SGSN or one or both of them may comprise a CGSN.

It should be clear that the inventive concept is not limited to any particular access technologies or to any particular nodes in the core network except that they should have a functionality similar to that of a SGSN or a CGSN etc.

BRIEF DESCRIPTION OF THE DRAWINGS

The invention will in the following be further described, in non-limiting manner, and with reference to the accompanying drawings in which.

DETAILED DESCRIPTION OF THE INVENTION

According to the invention bicasting or duplication is always done by the packet data node, for example an SGSN, currently handling the mobile station, also denoted the old or source packet data support node or particularly the old SGSN, in case of an SGSN over the Gn/Gp interface towards the new or target packet data support node or SGSN independently of whether the mobile station moves from coverage of one radio access network to another and irrespectively of whether it moves from radio access network coverage of one type to another type, and particularly irrespecively of whether it moves from for example WCDMA to GSM or GPRS coverage or from GSM/GPRS to WCDMA coverage or any other access network. Particularly duplication or bicasting is carried out by the old packet data support node, also in cases when it moves from WCDMA coverage, when duplication normally, in the state of the art was done by the source RNC.

Thus, the bicasting is always done by a packet data support node, particularly an SGSN or a CGSN, in the core network including using 3GPP standardized signalling messages if such are required to prevent duplication from being performed elsewhere.

Figure 1:
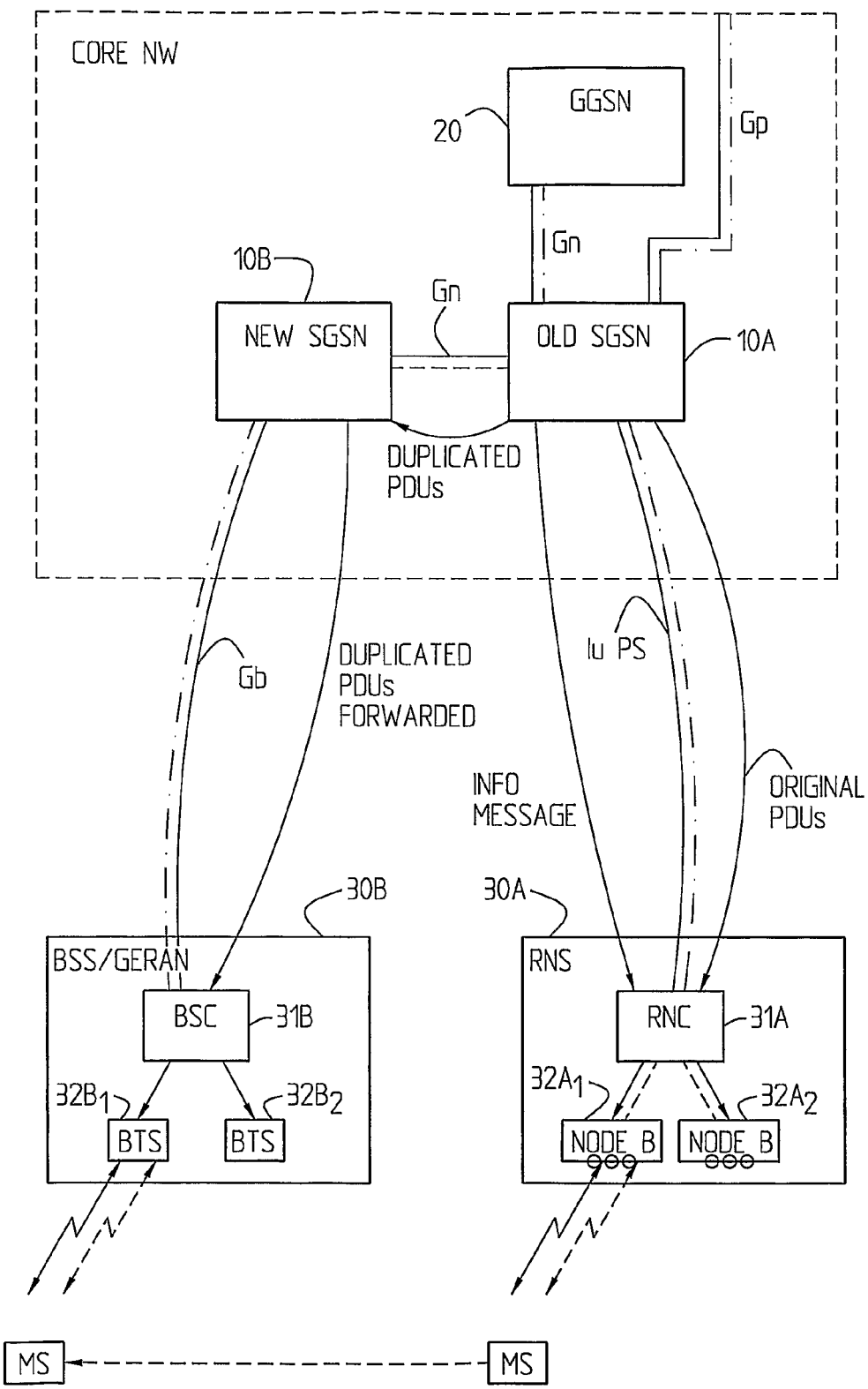
FIG. 1 schematically illustrates a system with a core network and access networks on which a handover is handled according to one implementation of the inventive concept.

FIG. 1 schematically illustrates a block diagram of a core network receiving packet data over a GGSN 20 connected over Gn interface to an SGSN 10A which over the Gn interface communicates with another SGSN 10B. In the figure the dashed lines illustrate interfaces supporting signalling whereas full lines illustrate interfaces supporting user traffic or payload, particularly in the form of packet data units, PDUs. In this figure in which it is intended to illustrate a handover from an RNS, Radio Network Subsystem 30A with an RNC 31A to a BSS/GERAN 30B it is supposed that the first SGSN 10A acts as an old SGSN whereas the other SGSN 10B acts as a new SGSN. Hence it is supposed that the mobile station MS moves from MS coverage over RNC 311 communicating with the old SGSN 10A over the Iu packet switched PS interface over the RNC 311 in turn communicating with node B 32A$_1$ to BSS/GERAN coverage via BSC (Base Station Controller) 31B connected to BTSs 32B$_1$ (Base Transceiver Stations) which interfaces new SGSN 10B over the Gb interface. The PS handover procedures are used to handover an MS with one or more packet flows from a source cell to a target cell. The source and the target cells can be located within either the same BSS, resulting in an Intra-BSS handover, in different BSS with the same SGSN, i.e. an Intra-SGSN handover, or belong to different SGSNs (Inter SGSN handover) or systems with different radio access types, inter RAT handover, inter mode handover. As long as the MS is still in the source cell, here covered by RNC 31A via node B 32A$_1$, radio resources in the target cell are allocated and signalled to the MS. System information of a target cell needed for access in the target cell is also signalled to the MS. Handovers are in a known manner divided into a preparation phase and an execution phase. During the preparation phase the procedure comprises the steps as described in 3GPP TS 43.129 v6.5.0, 2005-11 in a conventional manner.

From, here, for Iu to Gb mode handover it is here supposed that the old SGSN 10A performs a duplication of arriving downlink original packet data units PDUs, sending the original PDUs to RNC 31A, the duplicated PDUs to new SGSN 10B which forwards the duplicated PDUs to BSC 31B. It is also supposed that the old SGSN 10A sends an information message to RNC 31A, particularly an already existing message is used in which one information element is set to zero and hence the RNC 31A receives no information as to any duplication why it does not perform any duplications as normally would have been the case if a duplication or bicasting was required due to a handover. Actually the RNC 31A will not even be aware that there are being any duplications performed (here by the old SGSN 10A). Particularly the information element "RABs subject to data forwarding list" is set to zero in the signalling message "Relocation command" sent from SGSN 10A to RNC 31A. Particularly an RNC can support both a standardized way of doing bicasting and a bicasting solution implemented according to the inventive concept in SGSN instead.

Figure 2:
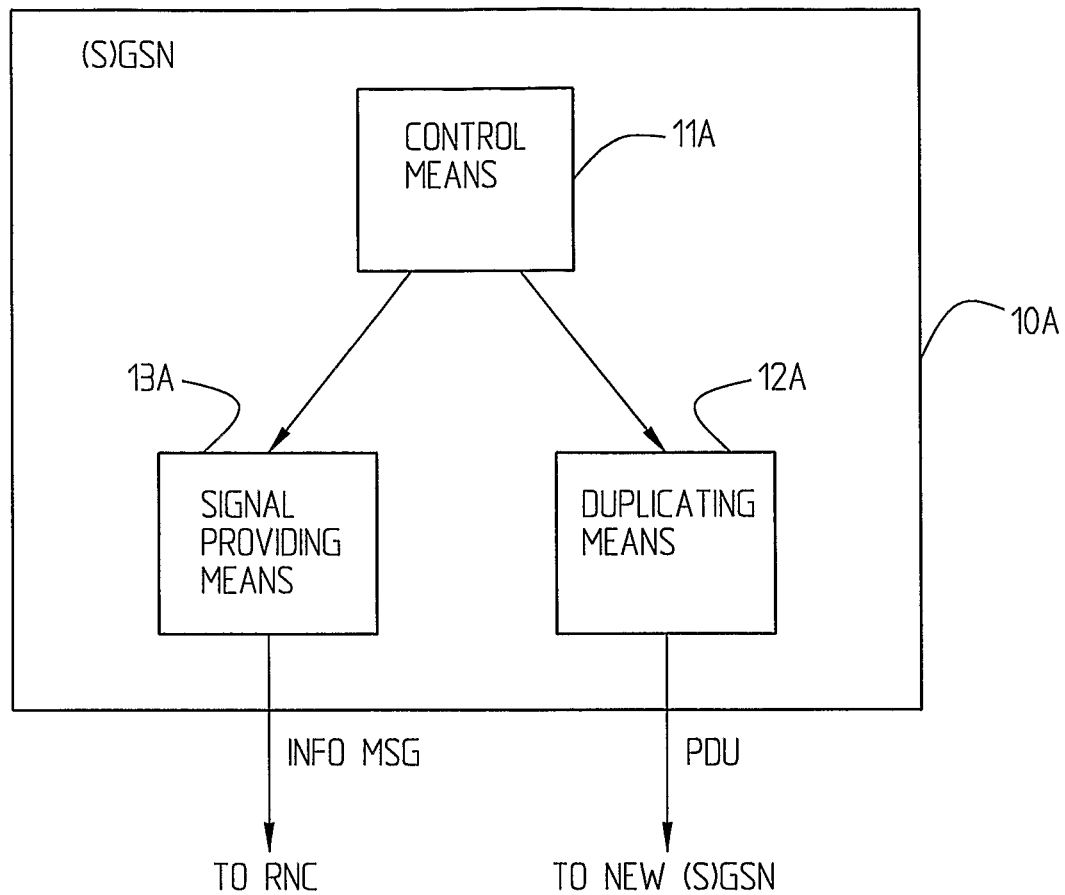
FIG. 2 is a schematical block diagram of an SGSN according to the inventive concept.

FIG. 2 very schematically illustrates a packet data support node or a GPRS support node GSN, most particularly an SGSN or a CGSN 10A. It should be clear that the packet data support node 10A is very simplified and only the means which are modified or necessary for carrying out the invention are shown. Hence it is supposed that SGSN 10A comprises control means 11A for, e.g. when a PS handover request or relocation request acknowledge message is received in the SGSN (depending on whether there being a WCDMA to GSM/GPRS handover or vice versa). Control means 11A hence controls duplicating means 12A which performs the duplication of the said subsequently received packet data units (particularly until a PS handover complete message is received from a target BSS or when a relocation complete message is received from a target RNC) and sends the duplicated PDUs to the new (S)GSN (or a CGSN if relevant). Packet data support node 10A also comprises signal providing means 13A for providing a message as discussed above to the old RNC if there is a handover from WCDMA to GSM/GPRS or similar to prevent the RNC from performing a duplication or rather to not initiate a duplication in the RNC. It should be clear that the signal providing means 13A only are activated by the control means if there is a change to GSM/GPRS from for example WCDMA while an information message to any RNC is not needed if there is a handover in the other direction.

Figure 3:
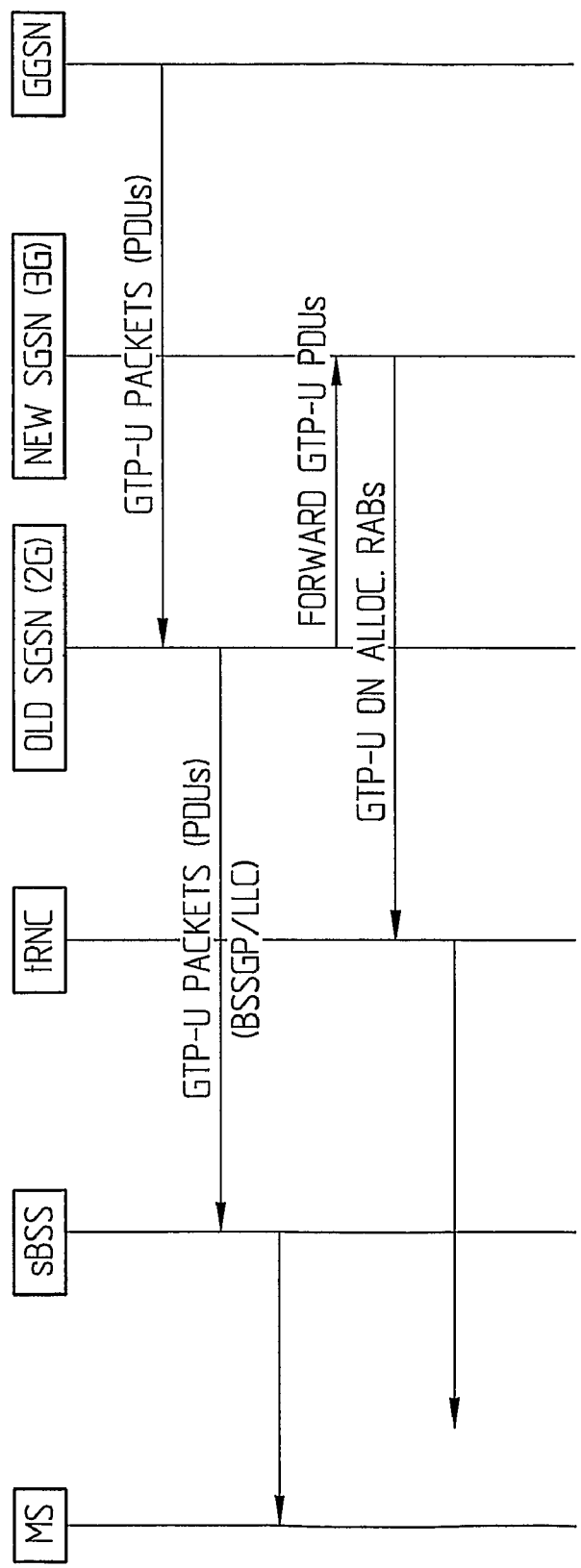
FIG. 3 is a sequence diagram illustrating an inter-SGSN handover from GSM/GPRS to WCDMA.

FIG. 3 is a sequence diagram illustrating those parts of an IRAT PS handover at an inter-SGSN GSM/GPRS to WCDMA handover, which are relevant for the inventive concept. It is hence supposed that packet data units or GTP-U packets are received in a node SGSN (2G) from a GGSN over the GTP-U interface (GPRS Tunneling Protocol-User Traffic). The packet data units, the PDUs originally received from GGSN, are forwarded from an old SGSN to a source BSS. The old SGSN also performs a duplication, and forwards the GTP-U PDUs to the new SGSN (3G) instead of to the target RNC (as in the state of the art). The new SGSN then forward the GTP-U PDUs on allocated RABs (Radio Access Bearers) to the target RNC. Hence, the whole procedure is handled within the core network instead of involving the access network. Thus, there is no need to inform any node on the radio network about the duplication procedure, and the radio network node does not know or does not need to know where a packet comes not even if it is a duplicated packet or not.

Figure 4:
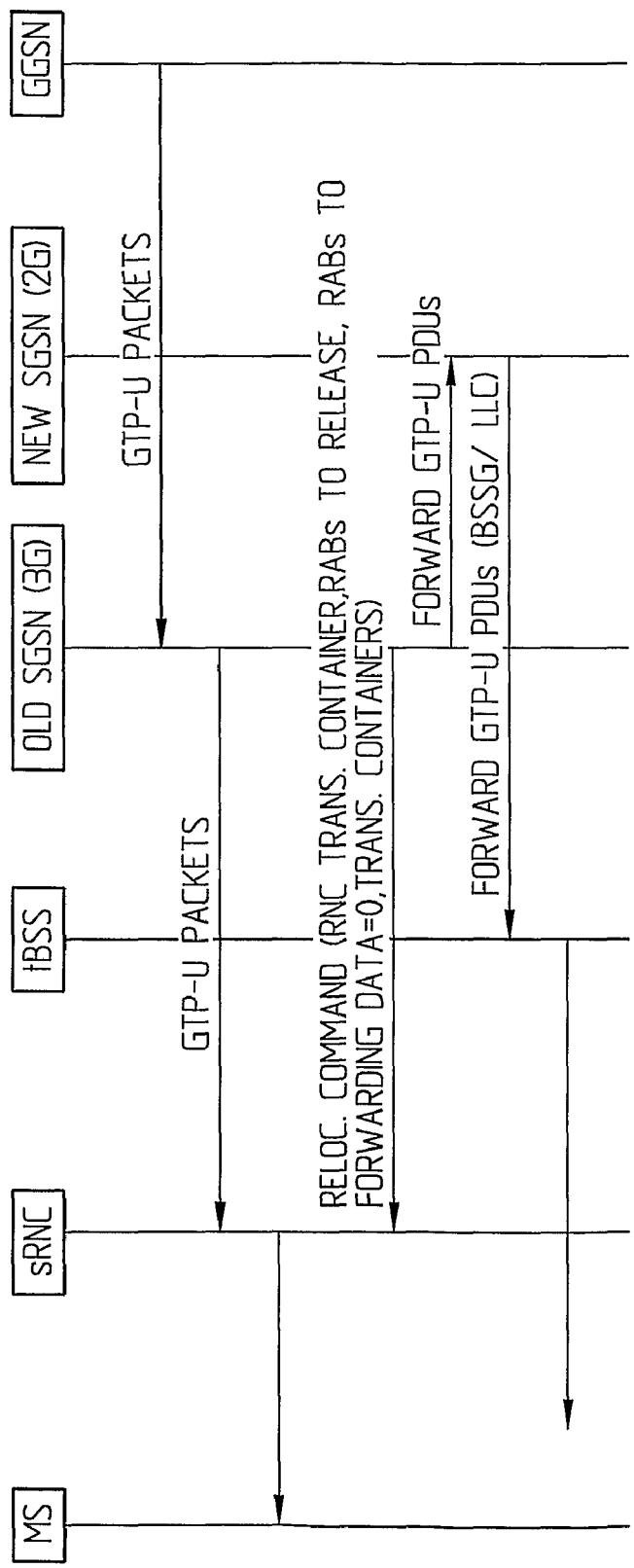
FIG. 4 is a sequence diagram illustrating an inter-SGSN handover between an old and a new SGSN for WCDMA-to-GSM/GPRS access.

FIG. 4 is a sequence diagram schematically illustrating the parts of an IRAT PS handover, inter-SGSN WCDMA to GSM/GPRS handover, that are relevant for carrying out the inventive concept. It is here supposed that a GTP-U packet is received from a GGSN to an old SGSN. The old SGSN sends the original GTP-U packet to the source RNC. In addition thereto, over the signalling interface, the old SGSN sends a relocation command message to the source RNC in which the information element "RABs forwarding data" is set to zero or NIL which means that the source RNC will not perform the duplication performed in the state of the art systems. The old SGSN will also perform duplication and forwards the duplicated packet data unit, to the target BSS via new SGSN (2G), which forwards it to the mobile station. Hence, the duplication procedure is entirely handled within the core network. The procedure starts upon finished preparation phase as discussed above.

Figure 5:
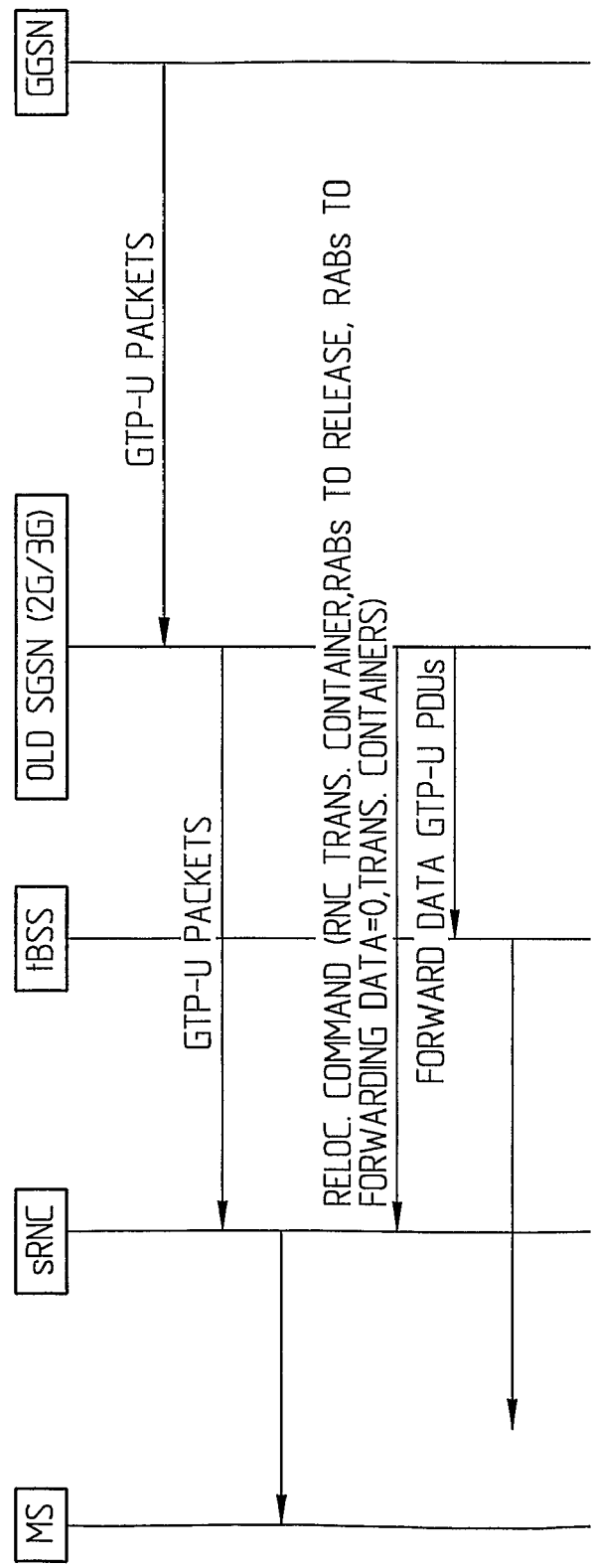
FIG. 5 is a sequence diagram describing an inter-SGSN handover from WCDMA to GSM/GPRS access.

FIG. 5 illustrates an embodiment with a dual mode SGSN, here denoted old SGSN, which supports access over WCDMA as well as GSM/GPRS, i.e. it shows an IRAT PS handover or an intra-SGSN WCDMA to GSM/GPRS handover with only of those parts of the execution phase which are necessary for carrying out the inventive concept. Thus it is supposed that the as old acting (also acting as new) SGSN receives a GTP-U packet from a GGSN. In a conventional manner it sends a GTP-U packet to the source RNC (for forwarding to the MS) but it also, over the signalling interface sends a relocation command to the source RNC as discussed with reference to FIG. 4, with the information element set to zero. In addition thereto it performs a duplication and sends the duplicated data packet to the target BSS for forwarding to the mobile station.

It should be clear that the SGSNs may as well be CGSNs i.e. the old or the new or both packet data support nodes may be CGSNs instead which means that the GGSN functionality also is included therein. Embodiments are also covered wherein a handover is performed between access networks of the same type (not explicitly illustrated in the figures) and whereas other similar access network technologies than those specifically illustrated are used.

It is an advantage of the invention that a standard packet forwarding will be used by for example an SGSN as in an ISRAU (Inter SGSN Routing Area Update) procedure, in the case of inter-SGSN handover, i.e. the Gn/Gp interface between SGSNs will be used. This means that the operators will be able to control the roaming traffic. It is also an advantage that charging of forwarded packets in the SGSN can be done only for non-forwarded packets in both the old and the new SGSN which means that duplicate charging will be avoided. There is also an advantage that the duplication etc. exclusively is handled by the core network and the access network does not have to be involved at all. Also in other aspects the invention is not limited to the specifically illustrated embodiments, but it can be varied in a number of ways within the scope of the appended claims.

The invention claimed is:

1. A method of handling a handover of packet data on a downlink to a mobile station over a core network, said core network comprising packet data support nodes and an access network comprising a radio network control node, said handover involving a change from a first packet data support node acting as an old, or current, source, packet data support node to a second packet data node acting as a new, target, packet data support node, comprising the steps of:
    completing a handover preparation procedure involving setting up communication channels to the mobile station over a new, target, radio network control node;
    duplicating received, original, data packets in the old, source, packet data node;
    sending the received, original data packets to the previous, source radio network control node;
    sending the duplicated data packets to the packet data node acting as a new, target, packet data node;
    sending the duplicated data packets to the mobile station from the packet data support node acting as a new, target, packet data node; and,
    sending an information message from the packet data support node acting as an old, source, packet data node to the source radio network control node, by using an information element of an existing message as the information message, the information message, or information element, comprising a zero, null, data message, indirectly indicating that no duplication of packet data is to be performed by the radio network control node.

2. The method according to claim 1, further comprising the step of terminating the duplication of packet data upon reception of a message from the new, target, radio network control node in the packet data support node acting as an old, source, packet data support node.

3. The method according to claim 1, wherein the old source radio network control node comprises a WLAN access node or an RNC of a Wideband Code Division Multiple Access network.

4. The method according to claim 1, wherein all duplication and sending of duplicated data packets is handled exclusively by packet data support nodes of the core network.

5. The method according to claim 1, wherein at least the target radio network control node comprises a BSS node, the handover being a handover within or to a GSM/GPRS network.

6. The method according to claim 1, wherein the packet data support node acting as an old packet data support node also acts as a new packet data support node.

7. The method according to claim 6, wherein the packet data support node acting as an old and as a new packet data support node is a dual access supporting node supporting WCDMA as well as GSM/GPRS access.

8. The method according to claim 1, wherein the old and new packet data support nodes are separate or different nodes.

9. The method according to claim 1, wherein the old and/or the new packet data support node(s) comprise(s) SGSN(s) and CGSN(s).

* * * * *

UNITED STATES PATENT AND TRADEMARK OFFICE
CERTIFICATE OF CORRECTION

PATENT NO. : 8,144,661 B2
APPLICATION NO. : 12/160321
DATED : March 27, 2012
INVENTOR(S) : Sundell et al.

It is certified that error appears in the above-identified patent and that said Letters Patent is hereby corrected as shown below:

In Column 5, Line 6, delete "311" and insert -- 31A --, therefor.

In Column 5, Line 8, delete "311" and insert -- 31A --, therefor.

Signed and Sealed this
Twenty-sixth Day of June, 2012

David J. Kappos
*Director of the United States Patent and Trademark Office*